United States Patent
Chen (10) Patent No.: US 12,259,085 B2
(45) Date of Patent: Mar. 25, 2025

(54) VERTICAL STAND

(71) Applicant: METEOR CITY LLC, Wilmington, DE (US)

(72) Inventor: Brian Johnny Chen, Quincy, MA (US)

(73) Assignee: METEOR CITY LLC, Wilmington, DE (US)

(*) Notice: Subject to any disclaimer, the term of this patent is extended or adjusted under 35 U.S.C. 154(b) by 0 days.

(21) Appl. No.: 18/179,614

(22) Filed: Mar. 7, 2023

(65) Prior Publication Data

US 2024/0301988 A1   Sep. 12, 2024

(51) Int. Cl.
*F16M 11/04* (2006.01)

(52) U.S. Cl.
CPC .................. *F16M 11/041* (2013.01)

(58) Field of Classification Search
CPC ...... F16M 11/041; F16M 11/02; F16M 11/04; F16M 11/2021; F16M 11/20
USPC ...... 248/176.1, 688, 676, 678, 188.6, 346.3, 248/346.5; 361/679.4, 679.01, 679.02, 361/679.55, 679.56
See application file for complete search history.

(56) References Cited

U.S. PATENT DOCUMENTS

| | | | |
|---|---|---|---|
| D311,001 S | 10/1990 | Hassel et al. | |
| 7,422,379 B2* | 9/2008 | Agevik | G03B 17/561 455/575.8 |
| 7,448,587 B2* | 11/2008 | Han | F16M 11/38 361/740 |
| 7,527,228 B2* | 5/2009 | Chung | F16M 11/22 248/154 |
| 7,777,110 B2* | 8/2010 | Wallis | G10G 5/00 248/443 |
| 8,496,289 B2* | 7/2013 | Chen | A47B 3/083 108/130 |
| 8,833,720 B2* | 9/2014 | Liu | A47B 65/15 248/346.07 |
| 9,226,057 B1* | 12/2015 | Davis | H04R 7/045 |
| 9,657,892 B1* | 5/2017 | Gong | F16M 11/10 |
| 9,715,248 B2* | 7/2017 | Wu | G06F 1/1607 |
| D828,361 S | 9/2018 | Turksu et al. | |
| 10,098,452 B2* | 10/2018 | Ko | F16M 11/38 |
| D844,623 S | 4/2019 | Chen | |
| 10,371,311 B2* | 8/2019 | Naylor-Warren | F16M 11/38 |
| 10,865,934 B2* | 12/2020 | Kwasniewski | F16M 11/041 |
| D917,495 S | 4/2021 | Hatfield et al. | |
| 11,013,317 B2* | 5/2021 | Huang | A47B 23/042 |
| D936,067 S | 11/2021 | Kanter et al. | |

(Continued)

FOREIGN PATENT DOCUMENTS

CN    305275656    7/2019
CN    305385442    10/2019

(Continued)

*Primary Examiner* — Christopher Garft
*Assistant Examiner* — Michael McDuffie
(74) *Attorney, Agent, or Firm* — Tucker Ellis LLP (57) ABSTRACT

Provided is a stand including a first side wall and a second side wall coupled to a hinged based. The hinged based is pivotally coupled together by at least one pin with a resilient member that biases the stand in an open position. The stand adjusts to a closed position when an electronic device is place between the sidewalls and on the hinged base urging the hinged based downward causing the side walls to rotate in toward the electronic device to hold the electronic device.

18 Claims, 12 Drawing Sheets

(56) References Cited

U.S. PATENT DOCUMENTS

| | | | |
|---|---|---|---|
| D939,515 S | 12/2021 | Zhang et al. | |
| 11,199,290 B2 | 12/2021 | Hatfield et al. | |
| D960,168 S | 8/2022 | Yang | |
| 11,672,335 B2 * | 6/2023 | Zavala | A47B 23/043 |
| | | | 248/176.1 |
| 2009/0218454 A1 * | 9/2009 | Stanley | F16M 13/00 |
| | | | 248/306 |
| 2010/0150543 A1 * | 6/2010 | Fong | F16M 11/10 |
| | | | 396/428 |
| 2016/0088749 A1 * | 3/2016 | Liu | F16M 13/022 |
| | | | 248/688 |
| 2021/0353051 A1 * | 11/2021 | Phifer | H04M 1/04 |
| 2022/0171430 A1 | 6/2022 | Liu et al. | |

FOREIGN PATENT DOCUMENTS

| | | |
|---|---|---|
| CN | 305688671 | 4/2020 |
| CN | 306351201 | 2/2021 |
| CN | 306363651 | 3/2021 |
| CN | 306753143 | 8/2021 |
| CN | 307083159 | 1/2022 |
| CN | B07054670 | 1/2022 |
| CN | 307108122 | 2/2022 |
| CN | 307327101 | 5/2022 |
| CN | 307532403 | 9/2022 |
| CN | 307532404 | 9/2022 |
| JP | 3126963 | 11/2006 |

\* cited by examiner

VERTICAL STAND

TECHNICAL FIELD

The present invention relates generally to electronic device stands, and more particularly to adjustable, vertical electronic device stands.

BACKGROUND OF THE INVENTION

Electronic device stands are used to hold or support one or more electronic devices, most commonly on desks. Vertical stands can be used to hold one or more electronic devices in a vertical orientation to maximize desk space.

SUMMARY OF THE INVENTION

In accordance with an embodiment of the present invention, a stand for holding electronic devices is disclosed. The stand may have a first side wall having a top and a bottom and a second side wall having a top and bottom. The stand may also have a hinged base having a first leaf and a second leaf pivotally coupled to the first leaf. The first leaf may be coupled to the first side wall, and the second leaf may be coupled to the second side wall to define a receiving area between the first and second side walls. The stand has an open position and a closed position. The stand is biased in an open position where the tops of the first and second walls are a first distance from one another. The stand is movable to a closed position where the tops of the first and second walls are a second distance less than the first distance from one another.

In another embodiment, the stand may comprise a first side wall having a top and a bottom and a second side wall having a top and a bottom. The bottom of the first side wall has a first cavity, and the bottom of the second side wall has a second cavity. The stand may also have a hinged base with a first leaf pivotally coupled to a second leaf. The first leaf may have a first flange configured to be received in the first cavity, and the second leaf may have a first flange configured to be received in the second cavity. The first side wall may be coupled to the first leaf by inserting the first flange into the first cavity. The second side wall may be coupled to the second leaf by inserting the second flange into the second cavity. Once coupled, a receiving space is defined between the first and second side walls and the hinged base. The stand has an open position and a closed position. In the open position the receiving space is empty and the walls are substantially perpendicular to a substrate the stand is resting on. In the closed position, an electronic is placed in the receiving space on the hinged base, and the weight of the electronic device urges the hinged base downward causing the tops of the first and second side walls to rotate inward to contact and support the electronic device.

In another embodiment, the stand may have a first side wall having a top, a bottom, and a first cavity and a second side wall having a top, a bottom, and a second side wall. The stand may have a hinged base having a first leaf and a second leaf pivotally coupled to the first leaf. The first leaf may have a first flange configured to be received in the first cavity, and the second leaf may have a second flange configured to be received in the second cavity. The first side wall, the second side wall, and the hinged base define a receiving area between the first and second side walls. The stand may have an open position where the tops of the first and second walls are a first distance from one another and closed position where the tops of the first and second walls are a second distance less than the first distance from one another.

In another embodiment, the stand may have a first side wall, a second side wall, and a hinged based. The hinged base may at least one pin, a first leaf, a second leaf, and a resilient member. The first leaf may have a plurality of first knuckles configured to receive the at least one pin and at least one rotation stop projecting outwardly from the plurality of knuckles, and the second leaf may have a plurality of second knuckles configured to receive the at least one pin and interlock with the first knuckles and at least one rotation stop projecting outwardly from the plurality of second knuckles. The at least one pin may extend through passages in the first knuckles, the second knuckles, and the resilient member to pivotally couple the first and second leafs together.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to a stand for holding electronic devices. Various electronic devices, including but not limited to cellphones, tablets, and laptops, are commonly used to accomplish a variety of tasks in day-to-day activities at home or the workplace. Frequently, the electronic devices may be attached to a docking station at a desk or workstation where the user may not directly hold or interface with the electronic device.

A stand for holding electronic devices, like the disclosed embodiments, may maximize the available desktop space and storage by holding one or more electronic devices in a vertical orientation. The disclosed embodiments may be adjustable to accommodate various electronic devices with different dimensions, such as the width and the height of the device. The stand may also include bumpers and support pads made of non-marring materials to protect the electronic devices when placed in the stand.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-7, a stand is shown generally at reference numeral 10. The stand includes a hinged base 12, a first side wall 14, and a second side wall 16 opposite the first side wall 14. The first and second side walls 14 and 16 are coupled to the hinged base 12, for example by mechanical fasteners, although it will be appreciated that the first and second side walls 14 and 16 may be integrally formed with the hinged base 16, for example by molding, or coupled to the hinged based 12 in another suitable manner. The hinged base 12, the first side wall 14, and the second side wall 16 define a receiving area 22 configured to receive and support electronic devices.

Turning additionally to FIGS. 8-17, the hinged base 12 will be described in more detail. The hinged base 12 includes a first leaf 30 and a second leaf 50 pivotally coupled to the first leaf 30. The first leaf 30 has a top surface 32, a bottom surface 33, a first end 34, a second end 35, a first flange 36 extending downwardly and outwardly from an edge of the bottom surface 33 of the first leaf 30, and a plurality of first leaf knuckles 38 opposite the first flange 36. Similarly, the second leaf 50 has a top surface 52, a bottom surface 53, a first end 54, a second end 55, a second flange 56 extending downwardly from an edge of the bottom surface 53 of the second leaf, and a plurality of second leaf knuckles 58 opposite the second flange 56. The first leaf knuckles 38 are longitudinally spaced from one another, and as shown are provided in pairs, with two leaf knuckles 38 near the first end 34 of the first leaf 30 and two leaf knuckles 38 near the second end 35 of the first leaf 30. Provided between the pairs of leaf knuckles 38 is a central leaf knuckle 40 having a length greater than the lengths of the other leaf knuckles. Similarly, the second leaf knuckles 58 are longitudinally spaced from one another, and as shown are provided in pairs, with two leaf knuckles 58 near the first end 54 of the second leaf 50 and two leaf knuckles 58 near the second end 55 of the second leaf 50. Provided between the pairs of leaf knuckles 58 is a receiving space 60 for receiving the central leaf knuckle 40. To allow for connection to one another, each of the plurality of first leaf knuckles 38 and the plurality of second leaf knuckles 58 have a bore 70 that extends through the knuckle in a longitudinal direction such that the bores are coaxially aligned with the bores on the same leaf 30, 50.

The first and second leafs 30 and 50 may also have one or more openings of various shapes and sizes that extend from the top surfaces 32 and 52 to the bottom surfaces 34 and 54 for ornamentation, to minimize weight, and/or to provide for air flow from the electronic device. For example, the first leaf 30 may include one or more openings 42, and as shown a plurality of longitudinally spaced openings 42, having a suitable shape, such as a substantially truncated triangle shape facing an opposite direction as an adjacent opening. Similarly, the second leaf 50 may include one or more openings 62, and as shown a plurality of longitudinally spaced openings 62, having a suitable shape, such as a substantially truncated triangle shape facing an opposite direction as an adjacent opening.

To pivotally couple the first leaf 30 and the second leaf 50, the plurality of first leaf knuckles 38 and the plurality of second leaf knuckles 58 are interlocked such that their respective bores 70 coaxially align to form a passage configured to receive at least one pin. Once aligned, the at least one pin 72 is slid into the passage and defines a pivot point such that the first and second leafs rotate about the pivot point. As illustrated, the first leaf 30 has four first leaf knuckles 36 and one central leaf knuckle 40, and the second leaf 50 has four second leaf knuckles 58. The first leaf knuckles 38 and second leaf knuckles 58 interlock and form the passage, with the pair of leaf knuckles 38 near the first end 34 of the first leaf 30 being disposed between the pair of leaf knuckles 58 near the first end 54 of the second leaf 50, the pair of leaf knuckles 38 near the second end 35 of the first leaf 30 being disposed between the pair of leaf knuckles 58 near the second end 55 of the second leaf 50, and the central leaf knuckle 40 received in the receiving space 50 between the inner most leaf knuckles 58. The first leaf 30 and second leaf 50 are coupled by two pins on opposite sides of the passage. It will be appreciated that the first and second leafs may have any suitable number of interlocking knuckles. It will further be appreciated that the stand may have a single pin that extends the length of the passage or another suitable pivoting coupling method like a snap-fit hinge.

Turning now to FIG. 3 and FIGS. 18-20, the exemplary side walls 14, 16 will be described in detail. The exemplary sidewalls 14, 16, as illustrated, are identical. The first and second side walls 14 and 16 each respectively include a top 80, 100, a bottom 82,102, a bottom surface 84, 104, a shoulder 86, 106, and a cavity 90, 110 at the bottom 82, 102 of the respective side wall. The cavities 90 and 110 are configured to receive the first flange 36 of the first leaf 30 and the second flange 56 of the second leaf 50 respectively. As illustrated, the cavities 90 and 110 may be substantially rectangular to receive the substantially rectangular flanges 36 and 56. Each cavity includes a recessed surface 88, 108 with a plurality of holes 92, 112 extending into the side wall configured to receive fasteners to couple the side wall 14, 16 to the respective leaf 30, 50. The first and second side walls 14 and 16 may be substantially triangular, as illustrated, although it will be appreciated that the first and second side walls may have another suitable shape. Additionally, the side walls 14 and 16 may have at least one cut out 94, 114 for ornamentation, to minimize weight, and/or to provide for air flow to the electronic device. For example, the side walls 14, 16 may include one or more cut outs 94, 114, and as shown one cut out 94, 114, having a suitable shape, such as a substantially triangular shape to correspond to the substantially triangular shape side wall 14, 16.

To assemble the stand 10, the hinged base 12 is coupled to the first side wall by placing the first flange 36 into the first cavity 90 such that an outer surface 44 of the first flange 36 contacts the recessed surface 88 of the first side wall 14 and holes 46 in the first flange 36 align with the holes 92 in the first side wall 14. Similarly, the hinged based 12 is coupled to the second side wall by placing the second flange 56 into the second cavity 110 such that an outer surface 64 of the second flange 56 contacts the recessed surface 108 of the second side wall 16 and holes 66 in the second flange 56 align with the holes 112 in the second side wall 16. It will be appreciated that the hinged base 12 maybe be assembled before or after being coupled to the side walls. As illustrated, mechanical fasteners such as screws may be used to couple the hinged base 12 to the side walls where the holes 92 and 112 in the first and second side walls are threaded holes. It will be appreciated that other suitable fasteners, such as pins, rivets, bolts, adhesives, etc. may be used to couple the side walls to the hinged base. Alternatively, the side walls 14 and 16 may include holes in the sidewall to couple to the hinged base without inserting the flanges 36 and 56 into any cavities.

Figure 1:
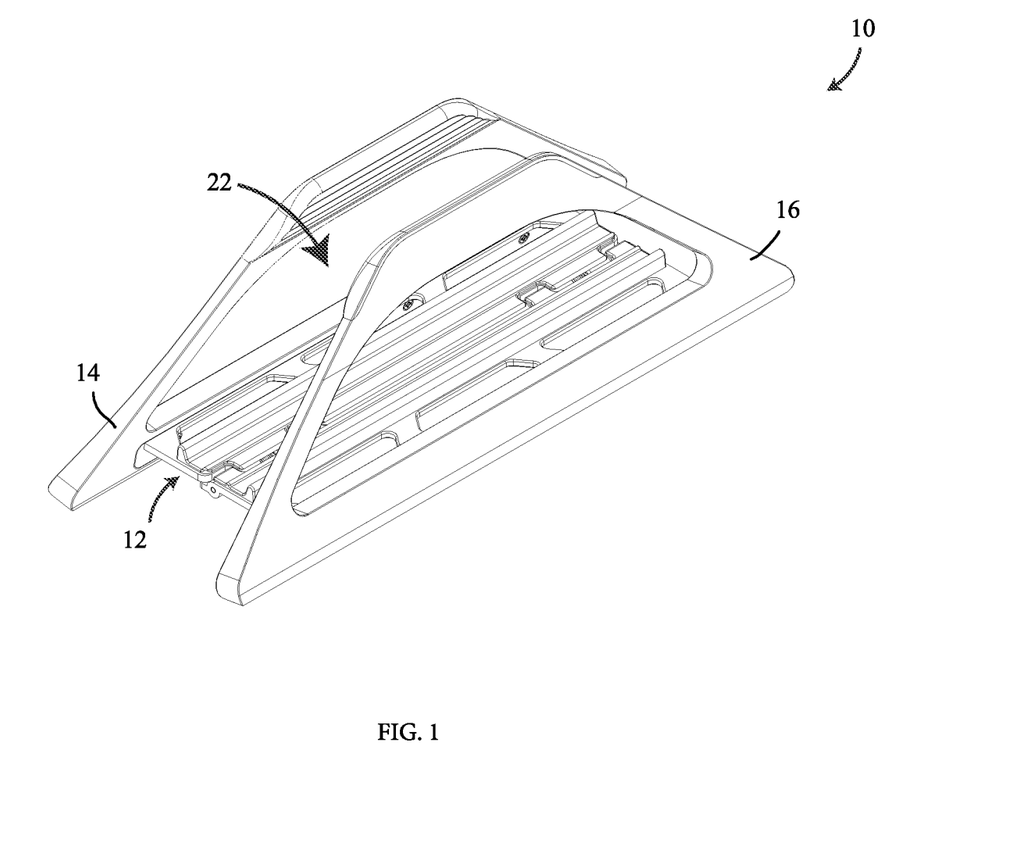
FIG. 1 is a top perspective view of an exemplary vertical stand.
Figure 2:
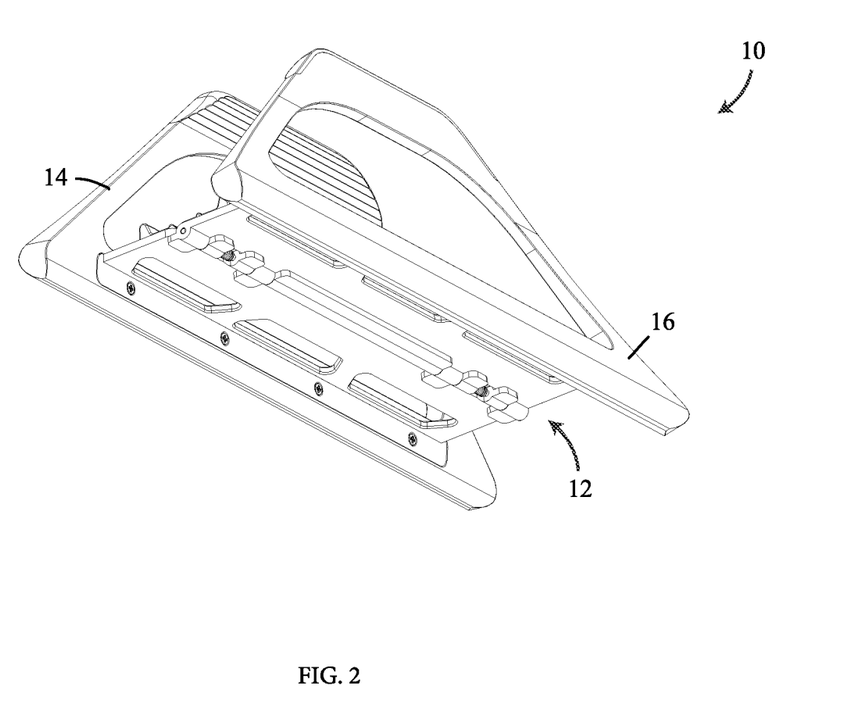
FIG. 2 is a bottom perspective view of an exemplary vertical stand.
Figure 3:
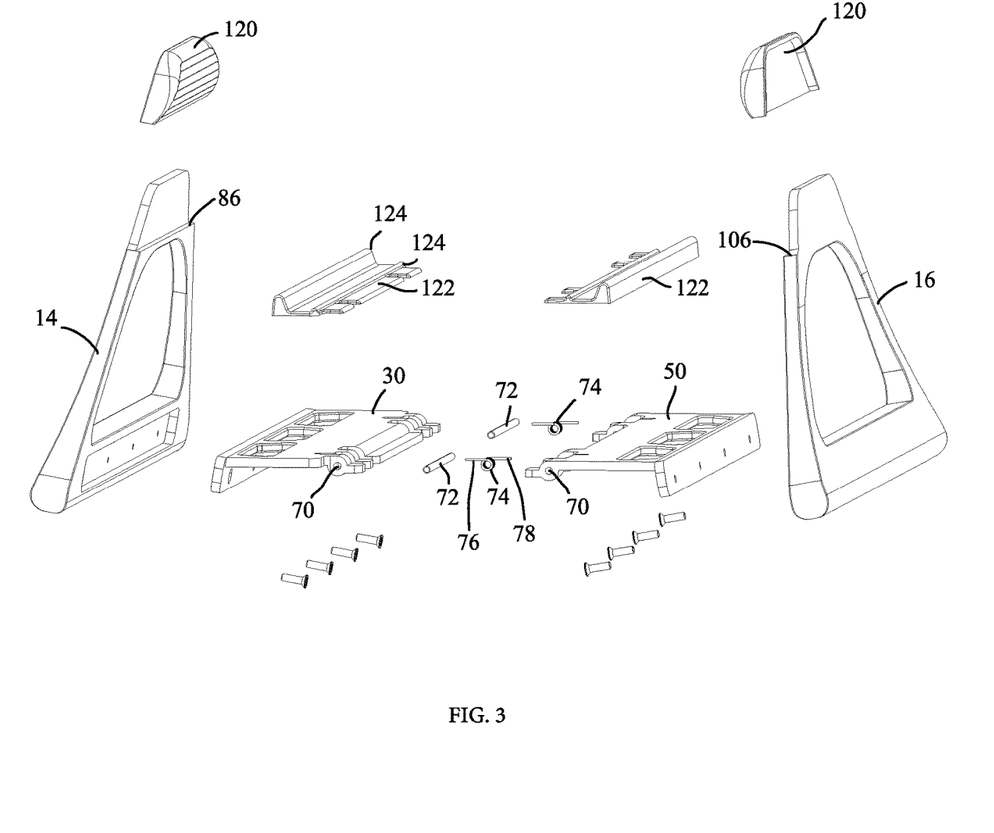
FIG. 3 is an exploded view of the exemplary vertical stand and its components.
Figure 4:
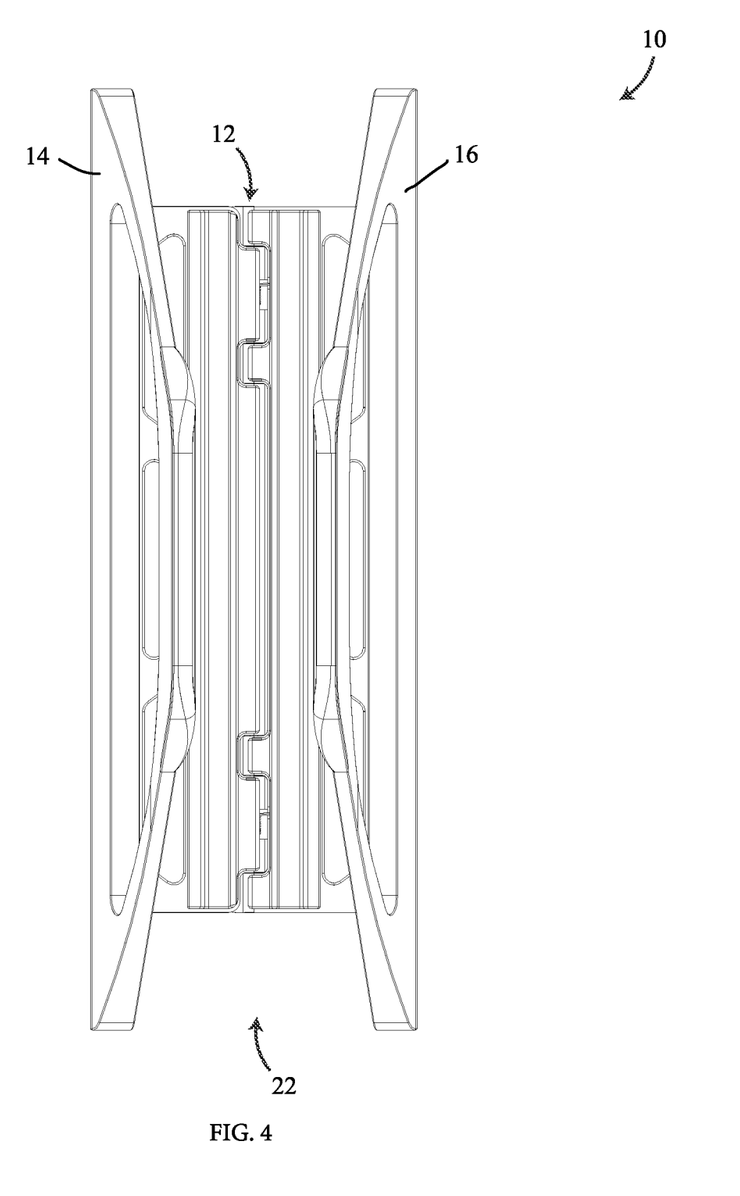
FIG. 4 is a front view of the exemplary vertical stand.
Figure 5:
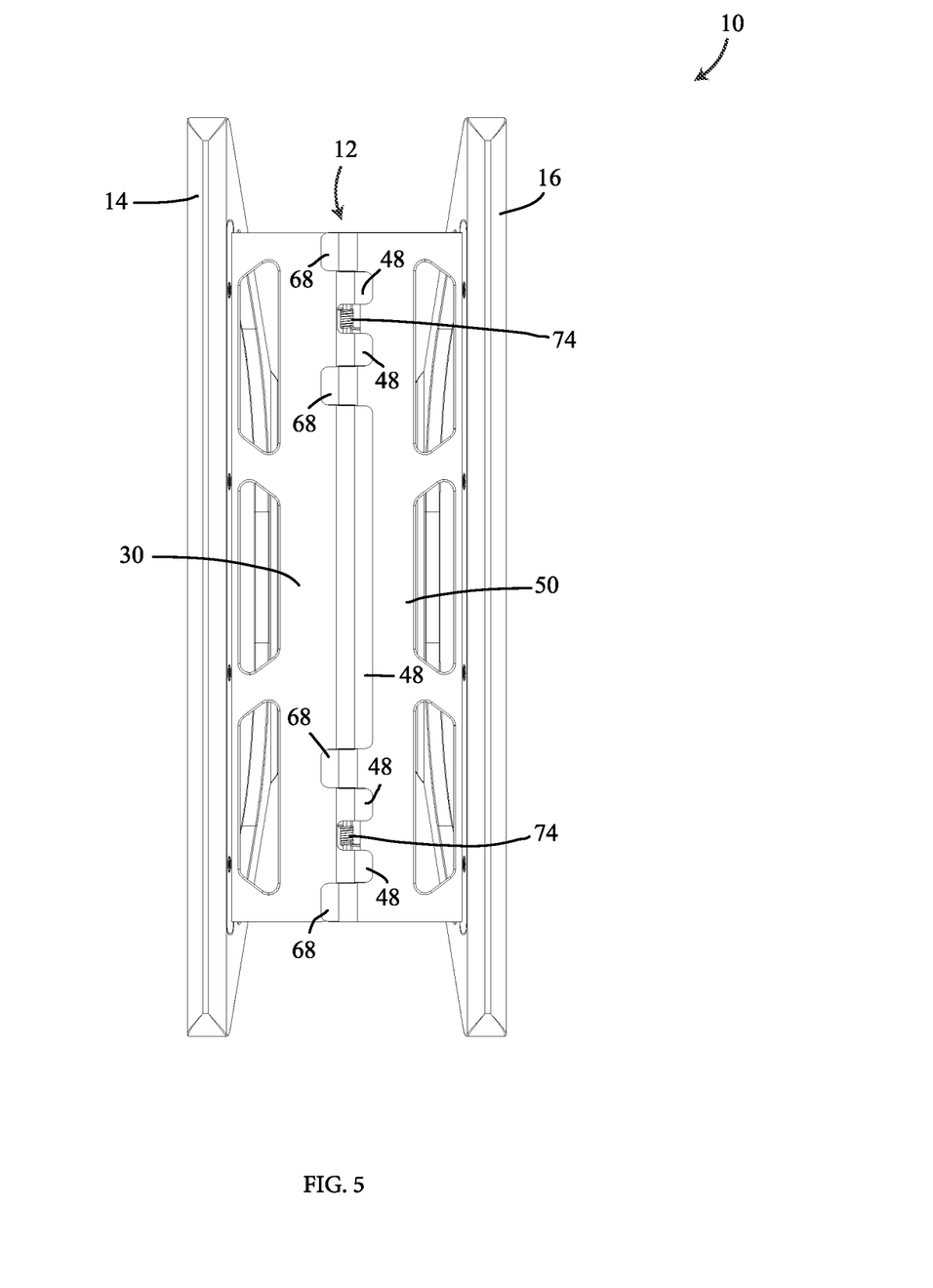
FIG. 5 is a top view of the exemplary vertical stand.
Figure 6:
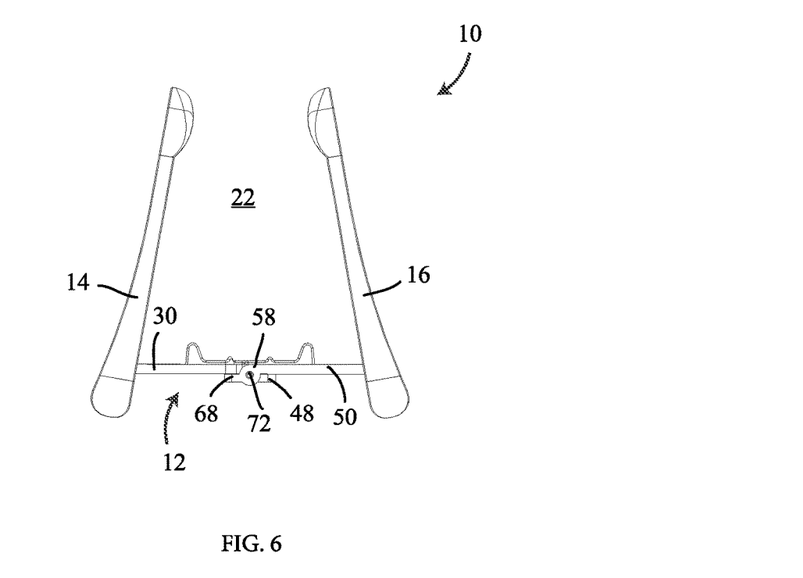
FIG. 6 is a bottom view of the exemplary vertical stand.
Figure 7:
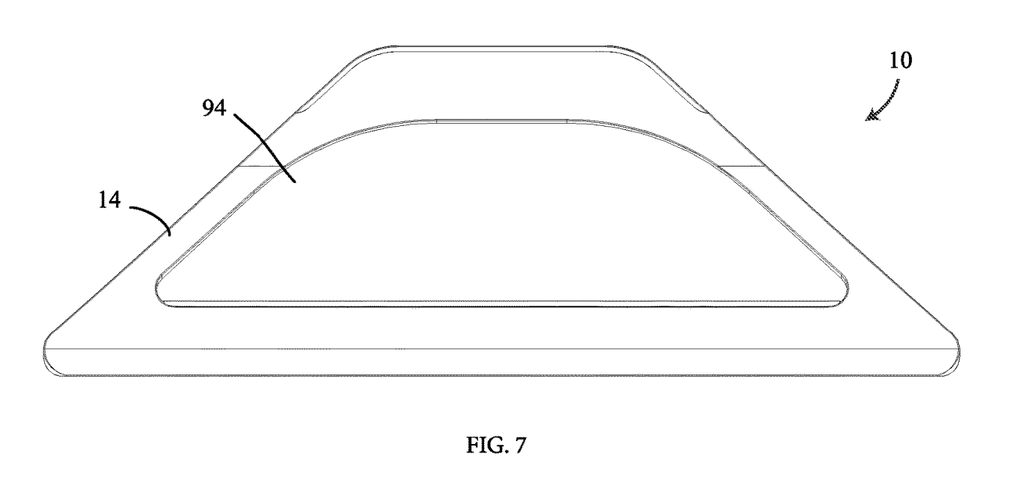
FIG. 7 is a left side view of the exemplary vertical stand.
Figure 8:
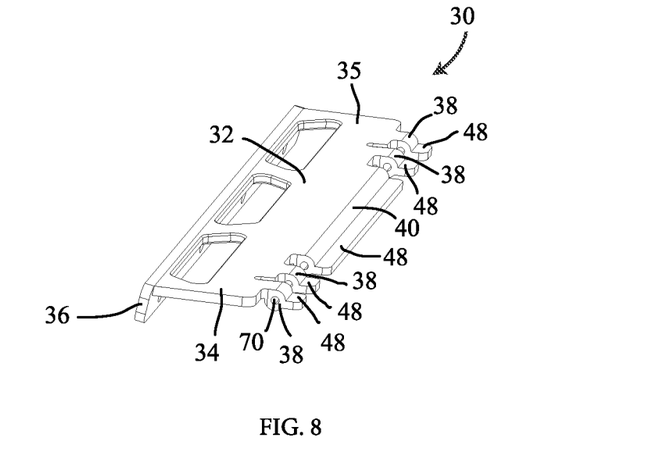
FIG. 8 is a perspective view of an exemplary first leaf.
Figure 9:
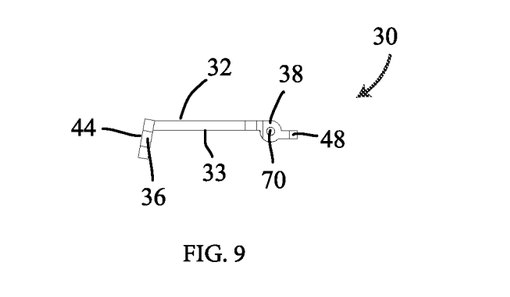
FIG. 9 is a front view of the exemplary first leaf.
Figure 10:
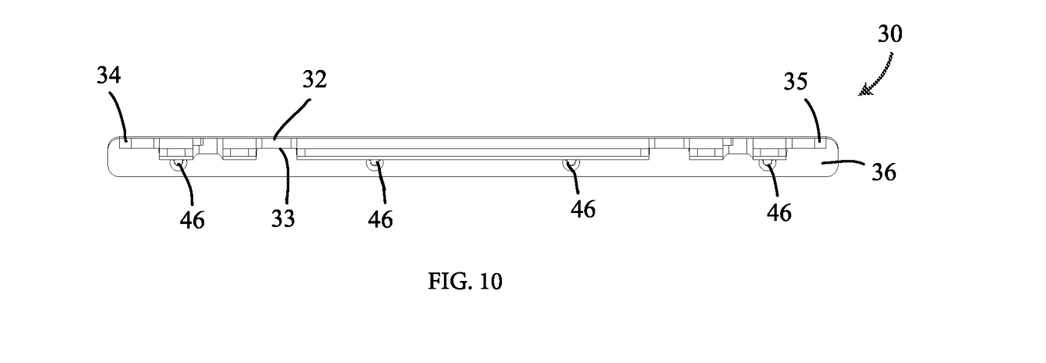
FIG. 10 is a right side view of the exemplary first leaf.
Figure 11:
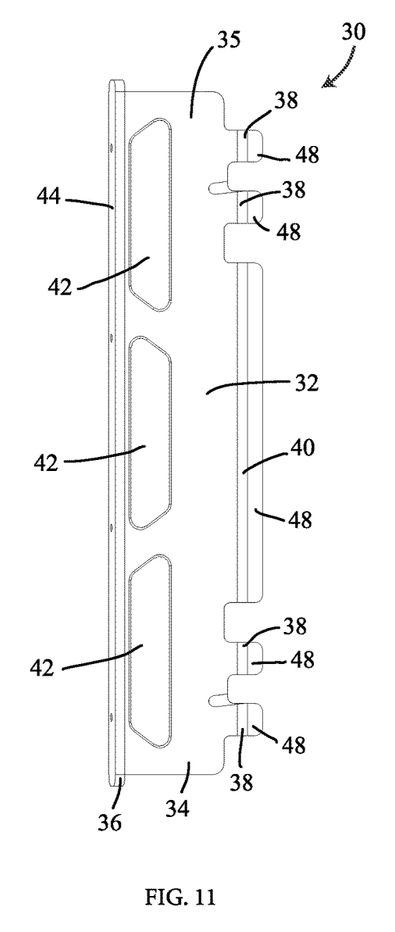
FIG. 11 is a top view of the exemplary first leaf.
Figure 12:
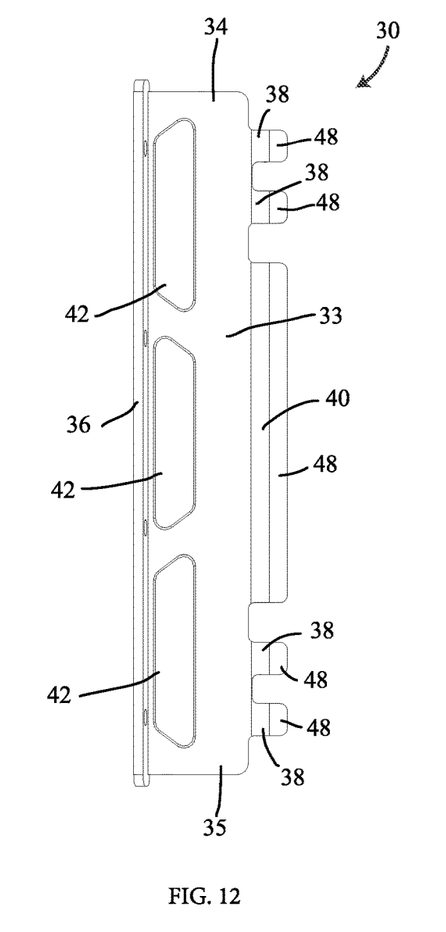
FIG. 12 is a bottom view of the exemplary first leaf.
Figure 13:
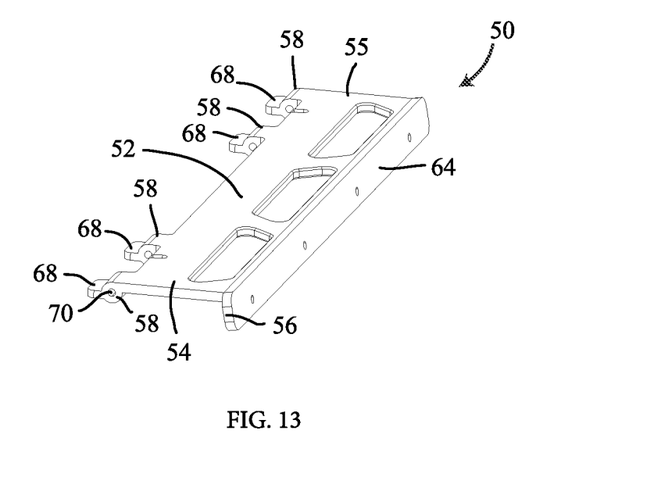
FIG. 13 is a perspective view of an exemplary second leaf.
Figure 14:
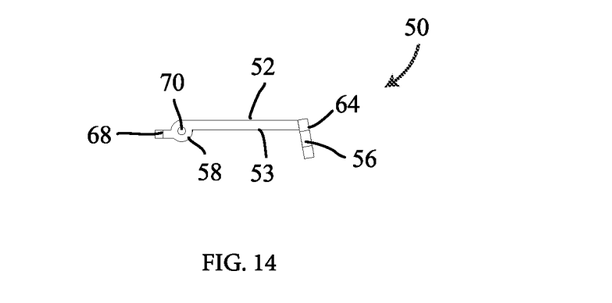
FIG. 14 is a front view of the exemplary second leaf.
Figure 15:
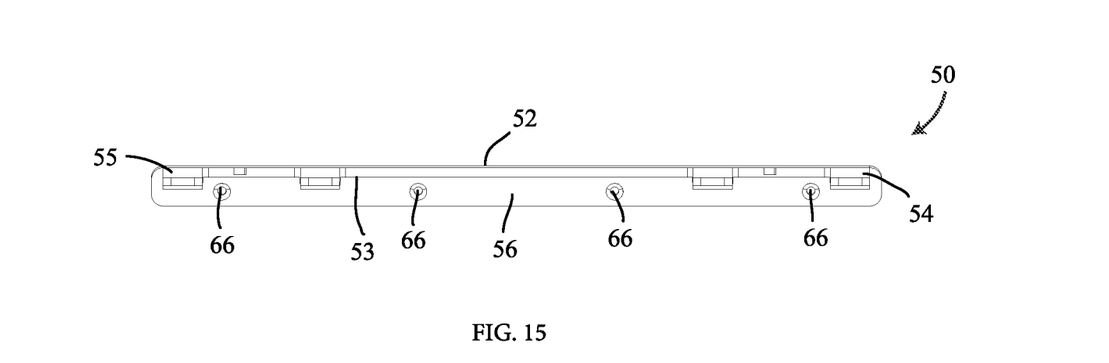
FIG. 15 is a left side view of the exemplary second leaf.
Figure 16:
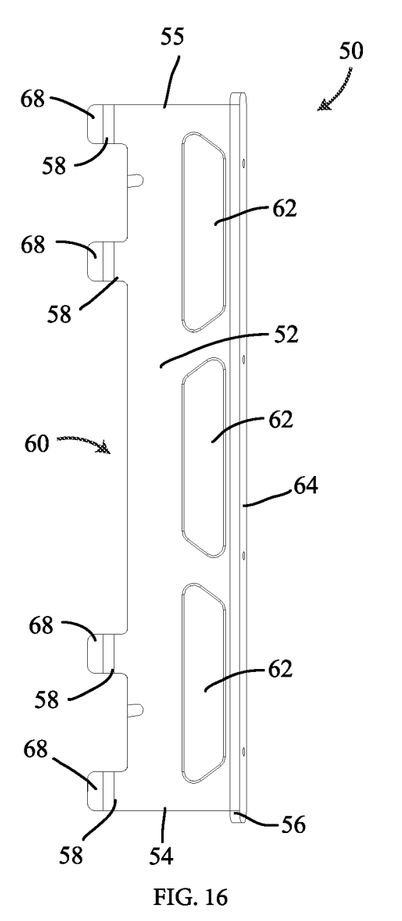
FIG. 16 is a top view of the exemplary second leaf.
Figure 17:
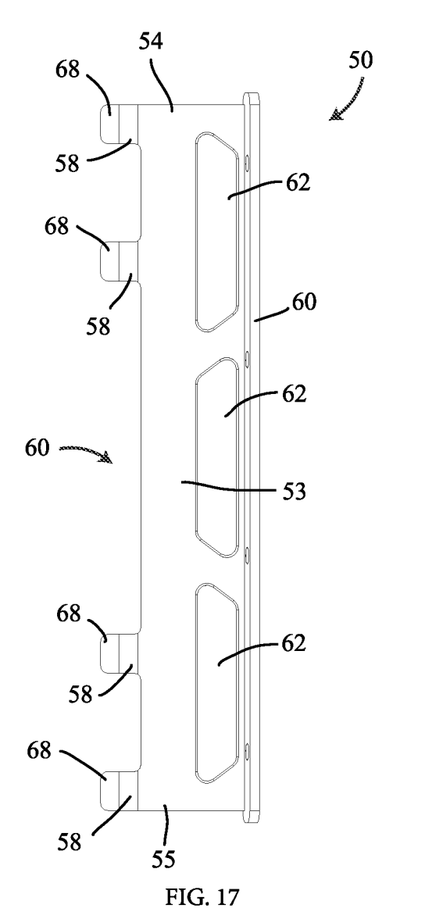
FIG. 17 is a bottom view of the exemplary second leaf.
Figure 18:
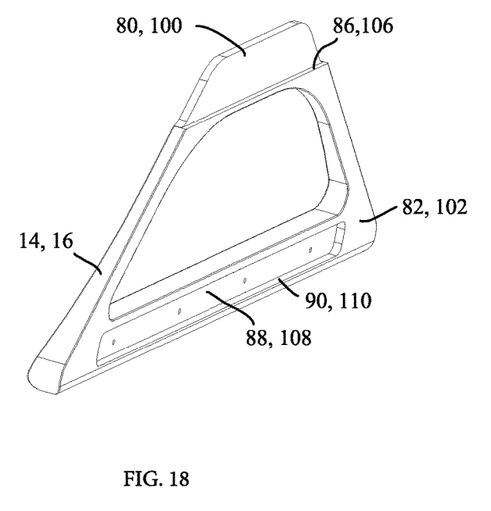
FIG. 18 is a perspective view of an exemplary vertical stand wall.
Figure 19:
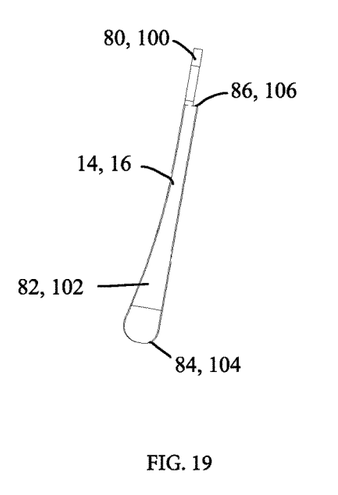
FIG. 19 is a front view of the exemplary vertical stand wall.
Figure 20:
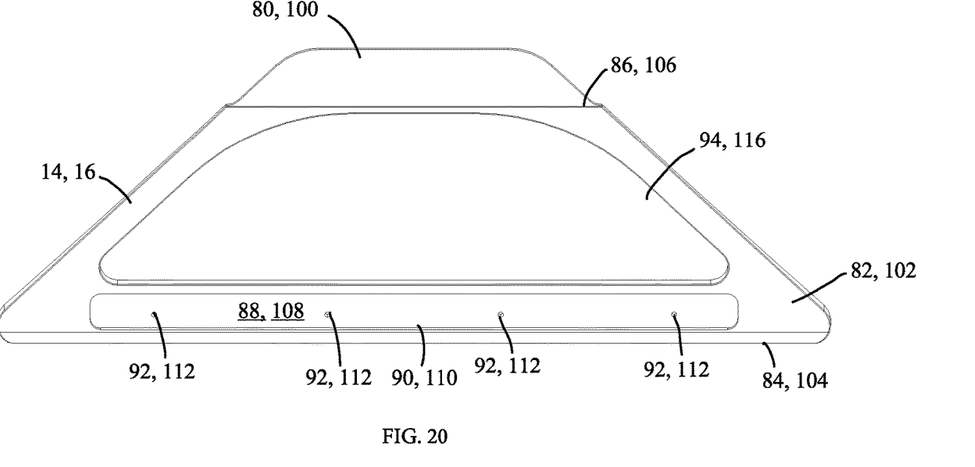
FIG. 20 is a right side view of the exemplary vertical stand wall.
Figure 21:
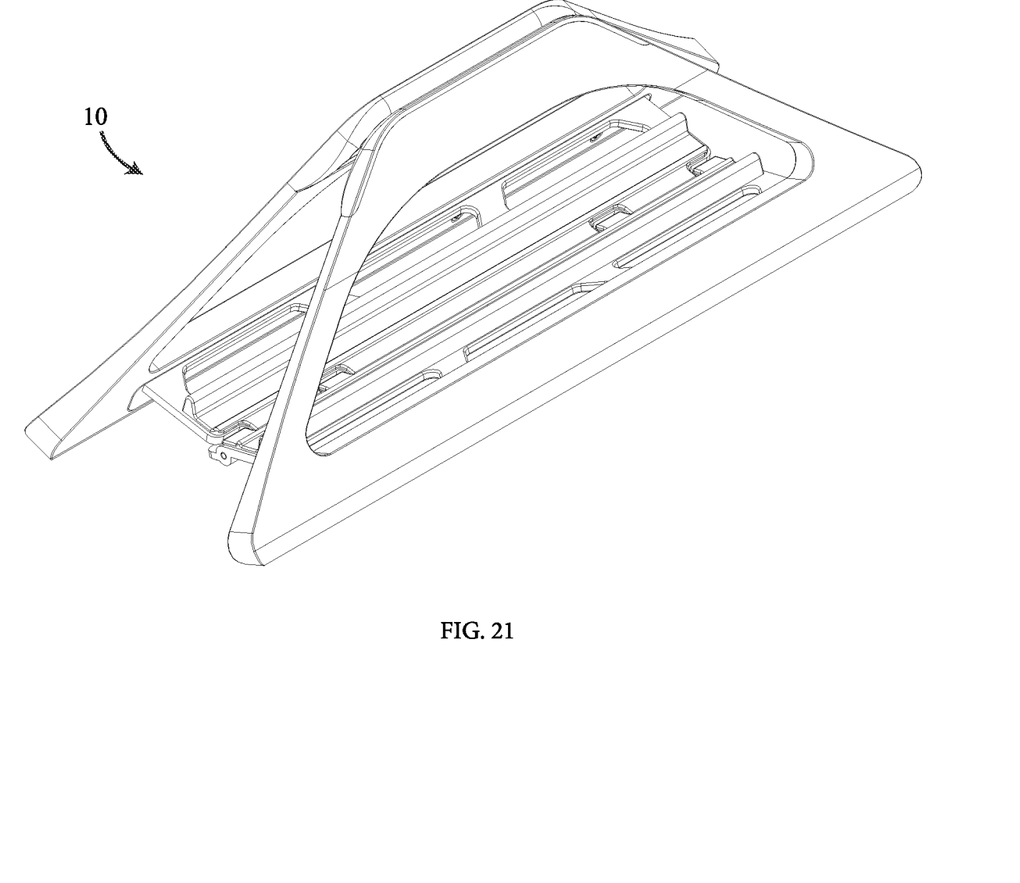
FIG. 21 is a top perspective view of the exemplary vertical stand in the closed position.
Figure 22:
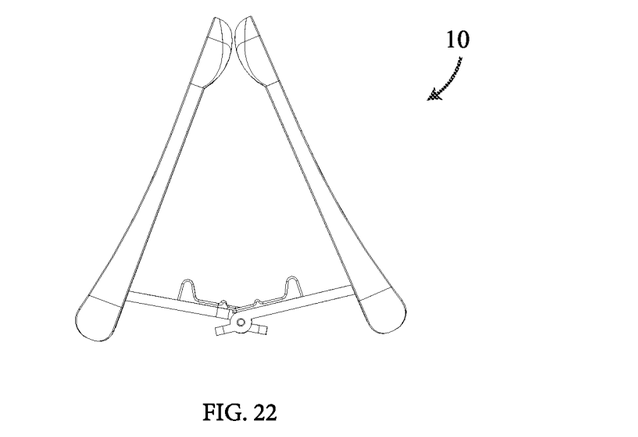
FIG. 22 is a front view of the exemplary stand in the closed position.

Once assembled, the stand 12 has an open position, shown in FIGS. 1-7, where the receiving area 22 is empty, and a closed position, shown in FIGS. 21-22, when an electronic device is placed in the receiving area 22 of the stand and the side walls move toward one another to support the electronic device. The stand is biased in the open position by at least one resilient member 74, such as a torsion spring, that is coaxially disposed with the plurality of knuckles 36 and 56 and the at least one pin 72 of the hinged base extends through the resilient member 74. The resilient member may have first protrusion 76 extending outwardly from the resilient member 74 and a second protrusion 78 extending outwardly from the resilient member 74 opposite the first protrusion 76. When the hinged base 12 is assembled and the resilient member 74 is coaxially disposed with the plurality of knuckles 36 and 56, the first protrusion 76 contacts the top surface 32 of the first leaf 30 and the second protrusion 78 contacts the top surface 52 of the second leaf 50 to bias the first and second leafs 30 and 50 away from each other. As illustrated, two resilient members 74 are provided, where one resilient member is provided between the pair of first leaf knuckles 38 near the first end 34 and another resilient member is provided between the pair of first leaf knuckles 38 near the second end 35.

In the open position, the hinged base 12 is substantially flat and parallel to the desk or substrate on which the stand 12 is resting. The plurality of first leaf knuckles 36 have a first rotation stop 48 extending outwardly from an external surface of each respective first leaf knuckle 38 and the plurality of second leaf knuckles 58 have a second rotation stop 68 extending outwardly from an external surface of each respective second leaf knuckle 58. When the stand is assembled and in the open position, the first rotation stops 48 contact the bottom surface 53 of the second leaf 50 and the second rotation stops 68 contact the bottom surface 33 of the first leaf 30 to prevent rotation of the hinged base past a predetermined position. As illustrated, the rotation stops 48 and 68 prevent the hinged base 12 from opening past the flat, horizontal position. It will be appreciated that the rotation stops could be positioned on the plurality of knuckles to allow for more or less rotation. While the illustrated stand includes a rotation stop on each knuckle, it will be appreciated that the stand may include less rotation stops than knuckles.

When the stand is in the open position, the first and second side walls 14 and 16 are substantially perpendicular to the desk or substrate. As illustrated, the first and side walls 14 and 16 may be coupled to the hinged base 12 such that the tops 80 and 100 of the side walls 14 and 16 are closer together than the bottom 82 and 102 of the side walls 14 and 16. The side walls 14 and 16 are angled approximately zero to fifteen degrees inward toward the receiving area 22.

To move the stand 10 to the closed position, an electronic device is placed into the receiving area 22 and onto of the top surfaces 32 and 52 of the hinged base 12. The weight of the electronic device urges the hinged based 12 downward toward the substrate on which the stand 10 is resting. As the hinged base 12 moves downward, the first and second leafs 30 and 50 rotate toward each other about the axis of the at least one pin 72. At the same time, the top 80 of the first side wall 14 and the top 100 of the second side wall 16 rotate inwardly toward the receiving area 22 until the tops of the side walls contact the electronic device placed in the stand. The tops 80 and 100 of the first and second side walls 14 and 16 grip and hold the electronic device in a substantially vertical orientation. To release the electronic device from the stand, the electronic device can be lifted upward out of the receiving area 22 and the stand will return to the biased open position. The bottom surface 84 and 104 of the first and second side walls 14 and 16 are curved to allow the rotation of the walls.

The stand 10 may include a plurality of bumpers 120 to act as a cushion between an electronic device and the tops 80 and 100 of the first and second side walls 14 and 16. The bumpers 120 may be positioned on the tops 80, 100 of the first and second side walls 36, 44. The shoulders 86, 106 of the first and second wall 14, 16 may be configured to abut a bottom surface of one of the plurality of bumpers 120. As illustrated, the shoulders 86 and 106 extend around the sides and the interior wall of the first and second side walls 14 and 16 and the bumpers 120 cover the sides and the interior wall of the sides walls 14 and 16. It will be appreciated the shoulders may extend around the entire side wall or just on the interior or exterior walls of the side walls. Alternatively, each respective bumper may encase and rest on the top of the side wall without a shoulder. The plurality of bumpers 20 may be made of a non-marring material, like a rubber or silicone based material.

The stand may further include support pads 122 that act as a cushion between the hinged base 12 and an electronic device when the electronic device is placed in the receiving area 22. The stand may have at least one support pad 122 disposed on the top surface 32 of the first leaf 30 and one on the top surface 52 of the second leaf 50. As illustrated, the support pads 122 are configured to cover the knuckles of the first and second leafs 30 and 50. The support pads 122 may include at least one ridge 124 that extends up into the receiving area to assist gripping and holding the electronic device. The at least one support pad 122 may be made of a non-marring material, like a rubber or silicone based material.

The aforementioned systems, components, (e.g., side walls, leafs, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A stand for holding electronic devices, the stand comprising:
   a first side wall having a top and a bottom;
   a second side wall having a top and bottom;
   a hinged base having a first leaf and a second leaf pivotally coupled to the first leaf, the first leaf coupled to the first side wall and the second leaf coupled to the second side wall to define a receiving area between the first and second side walls; and
   a support pad disposed on a top surface of the first leaf and a support pad disposed on a top surface of the second leaf, each support pad comprising at least one ridge that extends upward into the receiving area to assist holding and supporting the electronic device,
   wherein the stand is biased in an open position where the tops of the first and second walls are a first distance from one another, and movable to a closed position where the tops of the first and second walls are a second distance less than the first distance from one another.

2. The stand according to claim 1, wherein in the closed position, the hinged based moves downward toward a substrate.

3. The stand according to claim 1, wherein in the closed position, the first and second leafs pivot relative to one another causing the tops of the first and second side walls to rotate inward to contact the electronic device.

4. The stand according to claim 1, wherein the first leaf has a first plurality of knuckles and the second leaf has a second plurality of knuckles configured to interlock and align with the first plurality of knuckles.

5. The stand according to claim 4, wherein the first and second plurality of knuckles each include a passage extending therethrough that align with one another when interlocked to form an attachment passage.

6. The stand according to claim 5, wherein the first leaf and the second leaf are coupled by a rod disposed in the attachment passage.

7. The stand according to claim 1, wherein the hinged base additionally includes a resilient member biasing the stand in the open position when the receiving area is empty.

8. The stand according to claim 1, wherein the first leaf has a bottom surface and at least one rotation stop projecting outwardly from the first plurality of knuckles and the second leaf has a bottom surface and at least one rotation stop projecting outwardly from the second plurality of knuckles, and wherein when the stand is in the open position, the at least one rotation stop of the first leaf contacts the bottom surface of the second leaf and the at least one rotation stop of the second leaf contacts the bottom surface of the first leaf to prevent the hinged base from opening past a predetermined angle.

9. The stand according to claim 8, wherein the predetermined angle is 180 degrees and the hinged base is a flat surface when the stand is in the open position.

10. The stand according to claim 1, further comprising a bumper disposed on the top of the first side wall and a bumper disposed on the top of the second side wall.

11. The stand according to claim 10, wherein the first side wall and the second side wall each include a shoulder configured to contact and support a bottom surface of a respective one of the bumpers.

12. A stand for holding electronic devices, comprising:
 a first side wall having a top, a bottom, and a first cavity;
 a second side wall having a top, a bottom, and a second cavity; and
 a hinged base having a first leaf with a first flange configured to be received in the first cavity and a second leaf with a second flange configured to be received in the second cavity, the first and second leafs being pivotally coupled to one another,
 wherein the first side wall, the second side wall and the hinged base define a receiving area between the first and second side walls, and
 wherein the stand has an open position where the tops of the first and second walls are a first distance from one another and closed position where the tops of the first and second walls are a second distance less than the first distance from one another.

13. The stand according to claim 12, wherein the first leaf has a first plurality of knuckles opposite the first flange and the second leaf has a second plurality of knuckles opposite the second flange configured to interlock and align with the first plurality of knuckles.

14. The stand according to claim 13, wherein the first plurality of knuckles are longitudinally spaced from one another along a length of the first leaf and the second plurality of knuckles are longitudinally spaced form one another along a length of the second leaf.

15. The stand according to claim 13, wherein the first plurality of knuckles includes a first pair of knuckles and a second pair of knuckles and the second plurality of knuckles includes a third pair of knuckles and a fourth pair of knuckles, and wherein the first and third pairs of knuckles are configured to interlock and align and the second and fourth pair of knuckles are configured to interlock and align.

16. The stand according to claim 15, wherein the first leaf additionally includes a central knuckle positioned between the first and second pairs of knuckles, the central knuckle configured to be received in a receiving space in the second leaf.

17. The stand according to claim 12, wherein the hinged base additionally includes a resilient member biasing the stand into the open position when the receiving area is empty.

18. A stand for holding electronic devices, comprising:
 a first side wall;
 a second side wall; and
 a hinged base comprising:
  at least one pin;
  a first leaf coupled to the first side wall, the first leaf having a plurality of first knuckles configured to receive the at least one pin, a bottom surface, and at least one rotation stop projecting outwardly from the plurality of knuckles;
  a second leaf coupled to the second side wall, the second leaf having a plurality of second knuckles configured to receive the at least one pin and interlock with the first knuckles, a bottom surface, and at least one rotation stop projecting outwardly from the plurality of second knuckles; and
  a resilient member;
 wherein the at least one pin extends through passages in the first knuckles, the second knuckles, and the resilient member to pivotally couple the first and second leafs together, and wherein when the stand is in an open position, the at least one rotation stop of the first leaf contacts the bottom surface of the second leaf and the at least one rotation stop of the second leaf contacts the bottom surface of the first leaf to prevent the hinged base from opening past a predetermined angle of 180 degrees and the hinged base is a flat surface.

\* \* \* \* \*